March 2, 1943.                H. J. REITER                 2,312,441
                              SNAP FASTENER
                           Filed March 17, 1941
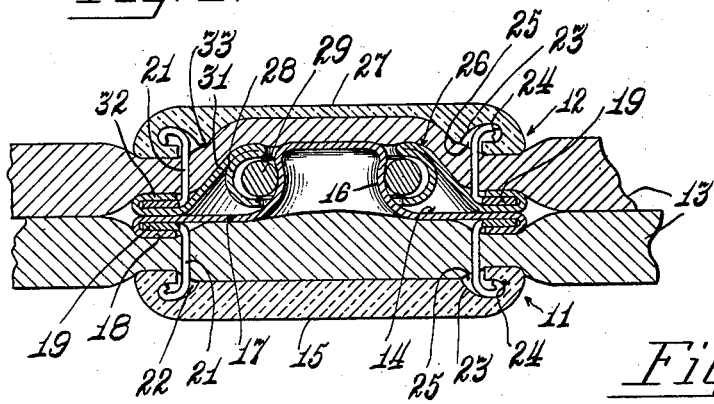
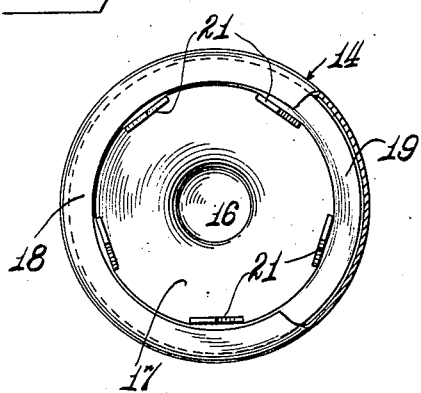
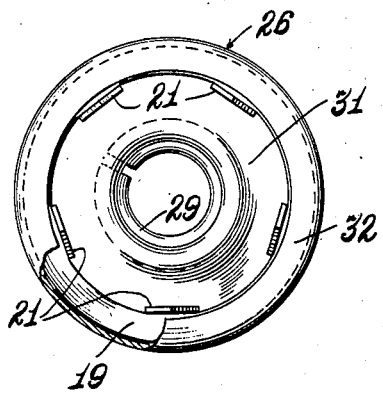
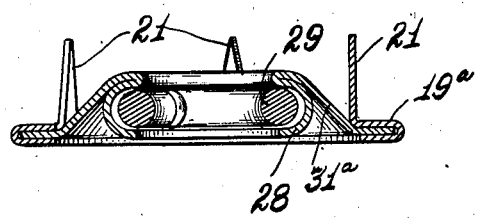
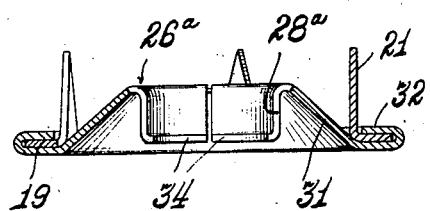
INVENTOR
HAROLD J. REITER
Elmer L. Zwickel
ATTORNEY Patented Mar. 2, 1943

2,312,441

UNITED STATES PATENT OFFICE 2,312,441

SNAP FASTENER

Harold J. Reiter, Chicago, Ill.

Application March 17, 1941, Serial No. 383,685

3 Claims. (Cl. 24—218)

The invention relates to improvements in a separable snap fastener installation and more particularly to structurally improved stud and resilient socket elements.

The invention herein disclosed is directed to snap fastener elements having piercing tangs associated therewith for cooperative engagement and clinching in suitable attaching elements and constitutes an improvement in the type of fastener elements illustrated and claimed in my Patent No. 2,235,168, issued March 18, 1941. The instant elements, which primarily are designed to produce fastener elements of that character from a minimum amount of material, are constructed with a separate tang carrying portion which is permanently attached to the fastener element by an assembly operation.

It is, therefore, an object of the invention to provide a novelly constructed snap fastener element with attached piercing tangs.

Another object is to provide novelly constructed male and female snap fastener elements with attached tangs arranged to pierce a sheet of material on which the elements are mounted, the tangs being located thereon so as to be entirely concealed when the elements are installed.

Another object is to provide male and female snap fastener elements with attached piercing tangs arranged inwardly of their circumferential margin whereby said elements produce a smooth unbroken periphery.

Another object is to provide male and female snap fastener elements with means permanently affixed thereto arranged to pass through the sheet of material on which the elements are installed and interlockingly engage in and be clinched by associated attaching elements.

Another object is to provide an attaching element of a type having a substantially smooth unbroken exposed surface and a channel on its under face arranged to receive tangs, and means to direct such tangs into said channel.

Another object is to provide a snap fastener installation wherein complemental portions of the material to which the fastener elements are attached are spaced but a minimum distance apart when the elements are interengaged.

Another object is to provide an efficient, inexpensively constructed, reinforced snap fastener installation embodying simple readily attached elements.

The foregoing and such other objects of the invention as will become more readily apparent as the description proceeds, will be more readily understood from a perusal of the following description; in which reference is had to the accompanying drawing, wherein:

Fig. 1 is an enlarged longitudinal sectional view of a snap fastener installation.

Fig. 2 is a plane view of the rear or tanged face of the socket element.

Fig. 3 is an inverted plane view of the stud element, showing the tangs thereon.

Fig. 4 is a longitudinal central sectional view through a modified form of socket element.

Fig. 5 is a sectional view, similar to Fig. 4, showing another modification.

All reference numerals used herein identify corresponding parts in the drawing.

Referring particularly to the snap fastener installation illustrated in Figs. 1 to 3 inclusive, the fastener includes male and female members 11 and 12. Said members are secured respectively to separate complemental portions of fabric, leather or other sheet material 13 and are arranged to detachably interlock to hold said portions together.

As best shown in Figs. 1 and 3, the male member 11 consists of a circular stud element 14 and attaching element 15. The stud element 14 is formed integral preferably from a thin circular sheet of metal. A substantially cylindrical wall defines a centrally located tubular body or stud portion 16 which is formed by striking or drawing the metal of the sheet upwardly. The stud portion preferably is closed at its top and its cylindrical wall bows outwardly and then tapers inwardly downwardly and finally outwardly to merge with a circular skirt portion 17. The skirt 17 preferably lies in a substantially horizontal plane and its outer circumferential margin is turned downwardly and then inwardly to provide a circumferential flange 18. The marginal portion of the skirt 17 and the flange 18 define an inwardly opening annular channel to receive a substantially flat ring 19. A plurality of pointed tangs 21 are formed integral with the free inner circumferential edge of the ring 19. These tangs preferably are spaced apart circumferentially and extend downwardly substantially at right angles to the plane of the skirt 17.

It should be noted at this time that the tanged ring 19 is mounted in place against the bottom face of the skirt 17 prior to turning the flange 18 inwardly and that when said flange is turned inwardly, the ring is tightly clamped within the channel. This structure provides a reinforced circumferential margin on the skirt consisting of three thicknesses of thin sheet material and also provides a smooth rolled circumferential edge on said skirt.

To mount a male member, its two piece assembled stud element 14 is placed over one face of the sheet of material 13 with its body or stud 16 disposed away from said material. The piercing tangs 21 are then forced through the material until the circumferential flange 18 rests against the face thereof. The attaching element 15, which is illustrated as a molded plastic cap, is arranged in axial alignment with the stud element against the other face of the material 13 prior to the piercing operation. As shown in Fig. 1, one face of the attaching element 15 is annularly grooved and undercut as at 22. The inside wall 23 of the groove is gradually curved outwardly and downwardly to present a surface which is contacted by the free ends of the tangs 21 when the latter are initially pressed downwardly thereagainst. Continued pressure causes the tangs to curl or roll outwardly radially along said curved surface into the undercut or circumferential channel 24.

Although the mounting operation may be accomplished by hand, it preferably is effected by the use of a suitable power press to insure sufficient curling of the tangs within the channel. This prevents separation of the male and attaching element and clamps the sheet of material securely therebetween. As attached, the tangs are wholly concealed from view due to their being spaced inwardly from the rolled circumferential edge of the stud element 14.

It is apparent that the tangs 21 cannot first be driven through the material and then carefully fitted into the channelled attaching element 15. Accordingly, the annular entrance slot 25, defined by the walls of the groove is considerably wider than the thickness of the metal forming the tangs. Consequently, whether the circle defined by the pointed ends of the circumferentially spaced tangs 21 is under or over size said tangs will always pass freely through the annular slot and engage the curved surface of the inner wall 23. It should be observed that the curvature of the said wall is substantially uniform throughout its width so as to cause the end of the tangs always to contact an outwardly sloping surface and buckling of the tangs is avoided.

The female member 12 preferably consists of a circular socket element 26 and an attaching element or cap 27. The socket element 26 also preferably is formed from a thin circular sheet of metal having its body or center portion struck or drawn out of the plane thereof and suitably rolled to provide an internally channelled socket wall 28. A split resilient ring 29 is carried in the channelled socket wall 28 to provide resilient means for yieldingly engaging the body or stud 16 of the male member 11 when said stud is inserted therein as shown in Fig. 1.

The upper end of the socket wall 28 terminates in a circular skirt 31 which extends downwardly and outwardly and preferably has its outer margin terminating in a plane below the plane of the stud receiving end of the socket. This construction protects the socket wall 28 from being damaged should the material carrying the female member be dropped or stepped upon. The structure also prevents damage of the socket wall while the material is being ironed.

The outer circumferential margin of the circular skirt 31 is turned upwardly and inwardly to provide a circumferential reinforcing flange 32 which is spaced from the skirt to define an inwardly opening circumferential channel which also receives a substantially flat ring 19 having a plurality of piercing tangs 21 integral with its inner circumferential edge and extending upwardly substantially at right angles to said ring.

To mount the female member, the pre-assembled socket element 26 is placed over one face of the material 13 with its tangs 21 in contact therewith. When pressure is applied, the tangs are forced through the material and the pointed ends curl outwardly radially into an inwardly opening circumferential channel 24 provided in the attaching element 27. The element 27 has an annular ridge 33 on its inside face spaced inwardly from the circumferential channel 24. The annular ridge 33 and the free inner edge of the outer channel wall constitute the inner and outer edges of an annular entrance slot 25 through which the tangs 21 pass when the elements are assembled. During the assembly operation, the outwardly and upwardly inclined surface 23 formed by the outer surface of the annular ridge 33 is initially contacted by the pointed ends of the tangs, consequently said tangs always curl outwardly radially into the channel 24.

The attaching elements or caps 15 and 27 illustrated, preferably are formed of a molded plastic, but obviously they may be formed of any suitable material such as for example wood, bone or metal. It should be noted also that the attaching element 27 is shaped on its bottom face to conform substantially to the contour of the socket member thus minimizing overall thickness in the assembly.

It is evident that the improved fastener members are not readily damaged and are not liable to tear or pull through the material to which they are attached. These advantageous features are primarily afforded by the arrangement of the tang carrying rings 19 on the circumferential margins of the fastener element skirts. The rings and the flanges 18 or 32, retaining them in place, stiffen the respective elements and consequently, said elements are not bent or otherwise distorted readily and the rolled circumferential edge on each element prevents cutting through the material and the resulting pulling out of the fastener member.

Fig. 4 shows a socket element 26a constructed substantially like that illustrated in Fig. 1 except that in this instance the resilient stud receiving socket consists of a cylindrical wall 28a extending downwardly from the upper inner end of a downwardly and outwardly inclined circular skirt portion 31. The lower free edge of said socket wall 28a is turned inwardly to provide a stud engaging lip or bead 34. The cylindrical wall 28a is suitably slit at one or more points inwardly from its beaded free end to define a plurality of resilient fingers adapted to yield when a stud is admitted or withdrawn therefrom. In this structure, the skirt portion 31 also preferably extends to a point in advance of or below the beaded end of the cylindrical split socket wall to afford suitable protection therefor, and its outer circumferential margin is rolled upwardly and then inwardly to provide a retaining flange 32 which overlies the tanged ring 19 in the same manner as in the split-ring socket structure previously described.

The socket illustrated in Fig. 5 also is substantially like that shown in Fig. 1 except that in this instance, an internally channeled reinforcing ring 19a is formed over the outer circumferential margin of the circular skirt 31a. This structure adequately reinforces the socket member and provides a rolled circumferential edge to prevent cutting or tearing of the material. It should be obvious that this specific ring construction may readily be employed also on a stud member of, for example, the general character shown in Fig. 1 and on a split-ring socket of the type illustrated in Fig. 4.

Obviously the instant structure results in a fastener installation wherein each fastener element is substantially embedded in the material and is adequately reinforced to prevent distortion of the skirt portion. The relative thinness of the reinforced flat edges of the skirts tends to bring the complemental pieces of material closely together as distinguished from certain known types of fasteners having a large rolled edge to receive tangs carried by the attaching member.

Although exemplary forms of construction have been illustrated and described, it is to be understood that the disclosure is illustrative rather than restrictive and that the invention is not to be limited thereby but is to embrace such variations as will fall within the spirit of the invention and the scope of the appended claims.

I claim:

1. A snap fastener socket installation comprising, in combination, a socket element made from a sheet of material and having an annular internally channelled socket wall, a split ring in the channel, a skirt integral with and extending downwardly and outwardly from the upper end of the channelled wall and having its outer marginal portion disposed substantially in the plane of the lower end of the said wall, the free circumferential edge portion of said marginal portion being folded upwardly and inwardly to provide a retaining flange, a ring carried on the top surface of said marginal portion beneath said flange, said ring being substantially the width of said retaining flange, and a plurality of piercing tangs integral with the free inner edge of said ring and extending upwardly substantially at right angles to the plane of said ring in close proximity to the inner edge of the retaining flange to prevent distortion of the tangs at their bases when subjected to endwise pressure; a sheet of supporting material disposed over the socket element with the tangs extending therethrough; and an attaching element disposed over said material having a circumferential channel to receive said tangs, said attaching element including means to deflect the free ends of the tangs into said channel when the two elements are pressed together.

2. A snap fastener socket element comprising, in combination, a stud receiving resilient socket, a circular skirt integral with and extending downwardly and outwardly from the upper end of the socket and having its free end disposed substantially in the plane of the lower end of said socket, a substantially flat ring arranged to lie against the upper surface of said skirt, and a plurality of piercing tangs integral with the inner edge of said ring and extending upwardly substantially at right angles thereto, the outer circumferencial margin of said skirt being folded upwardly and then inwardly to lie against the top surface of said ring and having its inner circumferencial margin disposed closely adjacent the bases of the tangs to minimize bending of said tangs at their bases when subjected to endwise pressure.

3. A snap fastener element comprising, in combination, a tubular body portion, a circumferencial skirt integral with and extending outwardly radially from one end of said body portion, a ring having an outer circumference substantially equal to the outer circumference of the skirt arranged on the face of the skirt opposite to the face from which the body portion extends, a plurality of piercing tangs integral with the inner circumferencial edge of said ring extending away from the skirt substantially at right angles to the plane of the ring, and means to join said ring and skirt together consisting of an inwardly opening annular channel on one of said parts to receive the other part.

HAROLD J. REITER.